US010573926B1

(12) United States Patent
Fan

(10) Patent No.: US 10,573,926 B1
(45) Date of Patent: Feb. 25, 2020

(54) HYBRID SOLID-STATE ELECTROLYTE

(71) Applicant: American Lithium Energy Corporation, Carlsbad, CA (US)

(72) Inventor: Jiang Fan, San Diego, CA (US)

(73) Assignee: American Lithium Energy Corporation, Carlsbad, CA (US)

( * ) Notice: Subject to any disclaimer, the term of this patent is extended or adjusted under 35 U.S.C. 154(b) by 264 days.

(21) Appl. No.: 15/466,792

(22) Filed: Mar. 22, 2017

Related U.S. Application Data

(60) Provisional application No. 62/312,396, filed on Mar. 23, 2016.

(51) Int. Cl.
| | |
|---|---|
| *H01M 10/056* | (2010.01) |
| *H01M 10/0567* | (2010.01) |
| *H01M 10/0568* | (2010.01) |
| *H01M 10/0569* | (2010.01) |

(52) U.S. Cl.
CPC ...... *H01M 10/056* (2013.01); *H01M 10/0567* (2013.01); *H01M 10/0568* (2013.01); *H01M 10/0569* (2013.01); *H01M 2300/0065* (2013.01); *H01M 2300/0071* (2013.01); *H01M 2300/0085* (2013.01); *H01M 2300/0091* (2013.01)

(58) Field of Classification Search
CPC . H01M 2300/0065; H01M 2300/0068; H01M 2300/0071; H01M 2300/0074; H01M 2300/0077; H01M 2300/008; H01M 2300/0082; H01M 2300/0085; H01M 2300/0091

See application file for complete search history.

(56) References Cited

U.S. PATENT DOCUMENTS

| | | | |
|---|---|---|---|
| 2002/0055041 A1* | 5/2002 | Kobayashi | H01M 4/13 429/221 |
| 2007/0122716 A1 | 5/2007 | Seo et al. | |
| 2008/0206646 A1 | 8/2008 | Kikuchi et al. | |
| 2008/0274411 A1* | 11/2008 | Nakajima | H01M 10/0525 429/322 |
| 2009/0176147 A1 | 7/2009 | Hatanaka et al. | |
| 2011/0003209 A1 | 1/2011 | Katayama et al. | |
| 2012/0115030 A1 | 5/2012 | Tanaka et al. | |
| 2013/0224557 A1 | 8/2013 | Hayakawa et al. | |
| 2013/0224558 A1 | 8/2013 | Kim et al. | |

(Continued)

OTHER PUBLICATIONS

Aono et al., "Ionic Conductivity of Solid Electrolytes Based on Lithium Titanium Phosphate," Apr. 1990, J. Electrochem. Soc., vol. 137, No. 4, pp. 1023-1027. (Year: 1990).*

(Continued)

*Primary Examiner* — Ula C Ruddock
*Assistant Examiner* — Matthew W Van Oudenaren
(74) *Attorney, Agent, or Firm* — Mintz Levin Cohn Ferris Glovsky and Popeo, P.C.

(57) ABSTRACT

A hybrid solid state electrolyte (SSE) can include a plurality of SSE particles suspended in a salt-in-solvent (SIS). A battery can include the hybrid SSE. The battery can be formed by at least forming the hybrid SSE in situ. Forming the hybrid SSE in situ can include: depositing, on a surface of an electrode of the battery, a mixture comprising the SSE particles and at least a portion of salt for the SIS; filling the battery with a solvent; and heating the battery to form the SIS by at least melting and/or dissolving the portion of the salt into the solvent.

14 Claims, 3 Drawing Sheets

(56) References Cited

U.S. PATENT DOCUMENTS

2013/0260207 A1 10/2013 Uemura
2014/0186696 A1* 7/2014 Onagi .................. H01M 4/587
 429/199
2015/0171398 A1 6/2015 Roumi

OTHER PUBLICATIONS

Minami et al., "Crystallization Process for Superionic Li7P3S11 Glass-Ceramic Electrolytes," 2011, J. Am. Ceram. Soc., 94, pp. 1779-1783. (Year: 2011).*

Murugan et al., "Fast Lithium Ion Conduction in Garnet-Type Li7La3Zr2O12," 2007, Angew. Chem. Int. Ed., 46, pp. 7778-7781. (Year: 2007).*

* cited by examiner

HYBRID SOLID-STATE ELECTROLYTE

RELATED APPLICATION

This application claims priority to U.S. Provisional Application No. 62/312,396 entitled NOVEL HYBRID SOLID-STATE ELECTROLYTE AND ITS APPLICATION IN SOLID STATE METAL BARRIERS and filed on Mar. 23, 2016, the disclosure of which is incorporated herein by reference in its entirety.

TECHNICAL FIELD

The subject matter described herein relates generally to battery technology and more specifically to battery electrolytes.

BACKGROUND

Electrolytes are highly conductive substances that enable the movement of electrically charged ions. For example, electrolytes in a battery can provide a pathway for the transfer of charged particles and/or ions between the anode and the cathode of the battery.

SUMMARY

Systems, methods, and articles of manufacture, including batteries and battery components, are provided. In some implementations of the current subject matter, there is provided a hybrid solid state electrolyte (SSE). The hybrid SSE can include a plurality of SSE particles suspended in a salt-in-solvent (SIS).

In some variations, one or more features disclosed herein including the following features can optionally be included in any feasible combination. The SSE particles can be a sulfide-based SSE. The sulfide-based SSE can be $Li_2S$—$SiS_2$—$P_2S_5$, $Li_7P_3S_{11}$, and/or $Li_{4.34}Ge_{0.73}Ga_{0.24}S_4$. The SSE particles can be a garnet-type lithium ion-conducting oxide. The garnet-type lithium ion-conducting oxide can be $Li_{5+x}La_3(Zr_x,A_{2-x})O_{12}$, wherein $1.4<x<2$. The SSE particles can be a ceramic ion conductor having a frame work structure that includes SRN, $PO_4$, and/or $ZnO_4$.

In some variations, the SIS can include a salt and a solvent. The salt can be lithium bis(perfluoroethylsulfonyl) imide [$LiN(SO_2CF_2CF_3)_2$ (LiBETI)], lithium bis [(1,1,1,3,3,3-hexafluoro-2-propoxy) sulfonyl] imide ($LiN[SO_2OCH(CF_3)_2]_2$ (LiHFPSI)), lithium hexafluorophoshate $LiFP_6$, lithium chloride (LiCl), lithium perchlorate ($LiClO_4$), lithium nitrate ($LiNO_3$), lithium bistrifluoromethanesulfonimidate ($LiN(SO_2CF_3)_2$ (LITFSI)), and/or oligomeric bis [(perfluoroalkyl)sulfonyl]imide (fluorosulfonimide) lithium salts. The solvent can be poly glycol, propylene carbonate (PC), ethylene carbonate (EC), acetone, acetonitrile, diethyl ether, diglyme (diethylene glycol dimethyl ether), dimethyl sulfoxide, 1, 4-dioxane, ethyl acetate, methyl t-butyl ether (MTBE), N-methyl-2-pyrrolidinone (NMP), pyridine, tetrahydrofuran (THF), crown ether, fluoride, xylene, 1-methoxy-2-propyl acetate, and/or phosphorus. The SIS can further include a gelling agent. The gelling agent can be a polymer.

In some variations, a battery can include the hybrid SSE. The battery can be formed by at least forming the hybrid SSE in situ. Forming the hybrid SSE in situ can include: depositing, on a surface of an electrode of the battery, a mixture comprising the SSE particles and at least a portion of salt for the SIS; filling the battery with a solvent; and heating the battery to form the SIS by at least melting and/or dissolving the portion of the salt into the solvent. The electrode can include another portion of the salt for the SIS. The heating of the battery can further form the SIS by at least the melting and/or dissolving the other portion of the salt into the solvent. The battery can be heated to a temperature of 60° C.-70° C.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

Description

Metal batteries, such as lithium (Li) batteries, may be susceptible to internal shorts. For example, the charging and discharging of a metal battery may give rise to metal dendrites. These metal dendrites may penetrate the porous separator between the anode and the cathode of the metal battery, thereby causing an internal short. Solid state electrolytes (SSEs) are not porous and not susceptible to being penetrated by metal dendrites. Therefore, SSEs can be used in metal batteries to prevent internal shorts caused by the formation of metal dendrites. However, conventional SSEs tend to be unstable and fragile. For instance, conventional SSEs can react with water and/or oxygen in the air as well as the electrodes in a battery. Conventional SSEs are further susceptible to breakdown during both the production and the operation of the battery. As such, in some implementations of the current subject matter, a hybrid SSE can be formed by suspending SSE particles in a salt-in-solvent (SIS), which stabilizes the SSE particles. The combination of SSE particles and the SIS yields a hybrid SSE that is more stable and robust than conventional SSEs.

Figure 1:
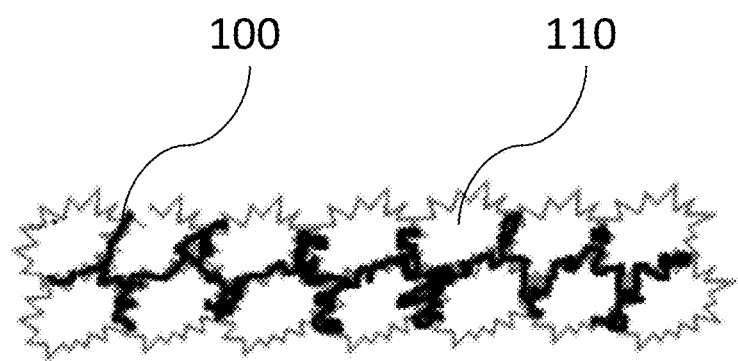
FIG. 1 depicts a hybrid solid-state electrolyte consistent with implementations of the current subject matter.

FIG. 1 depicts a hybrid SSE composite consistent with implementations of the current subject matter. As shown in FIG. 1, the hybrid SSE can be formed from SSE particles 110 suspended in a SIS 100.

A SIS may be a concentrated liquid electrolyte in which every solvent molecule is paired with one or more salt ions. As such, no free solvent molecules may be present in a SIS. This absence of free solvent molecules makes SIS different from conventional solvent based electrolytes or polymer electrolytes. The electrochemical stability of SIS can be determined by the salt that is present in the SIS.

In some implementations of the current subject matter, a SSE, such as a lithium sulfide ($Li_2S$) based solid state electrolyte, may be stable in the presence of a SIS. As such, a SIS may provide a stable, conformal interface for the SSE particles with respect to the electrodes (e.g., cathode, anode) of a battery. Referring again to FIG. 1, the SSE particles 100 can provide mechanical strength, which prevents metal dendrites from penetrating the separator in a battery. Meanwhile, the SIS 110 can provide a conformal interface between the SSE particles 100 and electrodes of the battery, thereby preventing reactions between the SSE particles 100 and the electrodes of the battery. It should be appreciated that the SIS 110 can include at least some polymer, which may act as a gelling agent.

In some implementations of the current subject matter, the SSE particles 100 can be any sulfide based SSE including, for example, $Li_2S$—$SiS_2$—$P_2S_5$, $Li_7P_3S_{11}$, and $Li_{4.34}Ge_{0.73}Ga_{0.24}S_4$. Alternately and/or additionally, the SSE particles 100 can be garnet-type lithium ion-conducting oxides such as, for example, $Li_{5+x}La_3(Zr_x, A_{2-x})O_{12}$ where $1.4<x<2$ (e.g., $Li_7La_3Zr_2O_{12}$). The SSE particles 100 can also be a ceramic ion conductor (e.g., LISICON) that contains the frame work structure $SiO_4$, $PO_4$, and $ZnO_4$.

In some implementations of the current subject matter, the SIS 110 can include one or more salts such as, for example, lithium bis(perfluoroethylsulfonyl) imide [LiN($SO_2CF_2CF_3$)$_2$ (LiBETI)], lithium bis [(1,1,1,3,3,3-hexafluoro-2-propoxy) sulfonyl] imide (LiN[$SO_2$OCH($CF_3$)$_2$]$_2$ (LiHFPSI)), lithium hexafluorophoshate $LiFP_6$, lithium chloride (LiCl), lithium perchlorate ($LiClO_4$), lithium nitrate ($LiNO_3$), lithium bistrifluoromethanesulfonimidate (LiN($SO_2CF_3$)$_2$ (LITFSI)), oligomeric bis[(perfluoroalkyl)sulfonyl]imide (fluorosulfonimide) lithium salts (e.g., $LiBF_4$, $LiSO_4$), and/or the like.

In some implementations of the current subject matter, the SIS 110 can include one or more solvents such as, for example, poly glycol, propylene carbonate (PC), ethylene carbonate (EC), acetone, acetonitrile, diethyl ether, diglyme (diethylene glycol dimethyl ether), dimethyl sulfoxide, 1, 4-dioxane, ethyl acetate, methyl t-butyl ether (MTBE), N-methyl-2-pyrrolidinone (NMP), pyridine, tetrahydrofuran (THF), crown ether, fluoride, xylene, 1-methoxy-2-propyl acetate, phosphorus (e.g., phosphoric acid tricresylester, phosphorous acid trisodecyl ester, phosphorous acid tri(4-methyl phenyl) ester, tetraphenyl phosphate), and/or the like.

It should be appreciated that the SIS 110 can include at least some polymer, which may act as a gelling agent. For example, poly ethylene oxide (PEO) and/or the like can be added to the SIS 110 to increase the viscosity of the SIS 110.

In some implementations of the current subject matter, the SIS 110 can be formed in situ by at least incorporating the components of the SIS 110 (e.g., salt, solvent, gelling agent) into one or more electrodes of a battery and then subjecting the battery to a heat. Forming the SIS 110 in situ obviates the addition of a highly viscous SIS during the production of the battery. For example, lithium salts may be added to an electrode during production of the electrode. Solvents (e.g., ethylene carbonate (EC) can also be added to the electrodes during production such as, for example, before the layers of the electrode are laminated to form a jelly flat lamination and/or before the jelly flat is wound into a jelly roll. Alternately and/or additionally, gelling agents (e.g., polymers such as poly ethylene oxide (PEO)) can be added to the electrodes during the production of the electrode.

Figure 2:
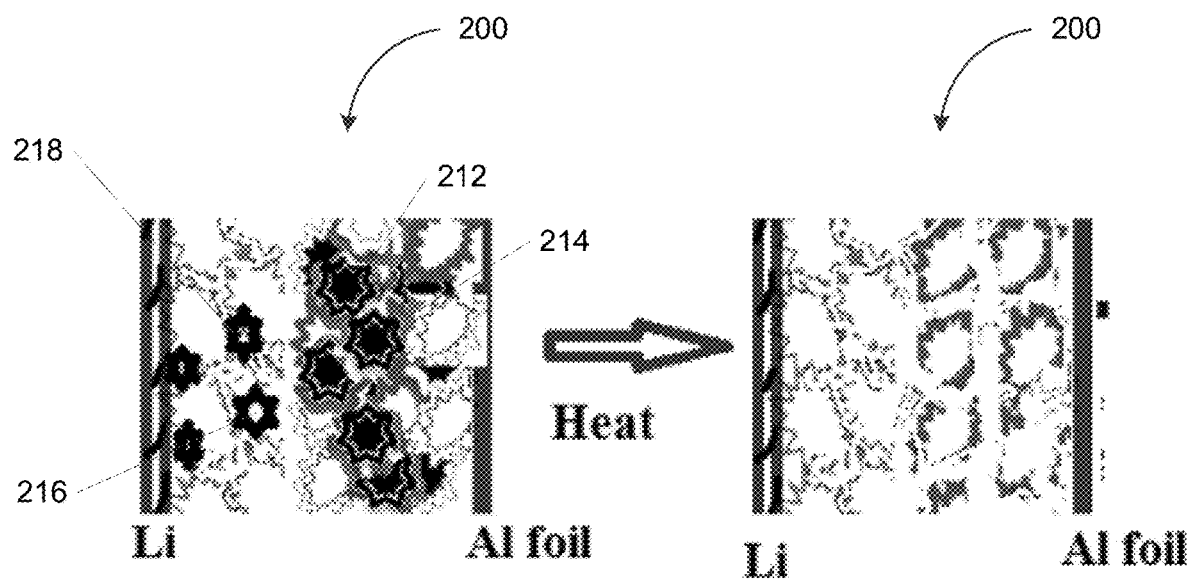
FIG. 2 depicts the effects of heating a solid state battery cell with a hybrid solid-state electrolyte consistent with implementations of the current subject matter.

FIG. 2 depicts the effects of heating a solid state battery cell 200 with hybrid SSE consistent with implementations of the current subject matter. As noted earlier, the SIS 110 can be formed in situ by at least incorporating the components of the SIS 110 (e.g., salt, solvent, gelling agent) into the electrodes of the solid state battery cell 200 and subjecting the solid state battery cell 200 to heat. Specifically, the SIS 110 can be formed subsequent to assembling the solid state battery 200 by at least heating the sealed solid state battery cell 200 to elevated temperatures. For example, the solid state battery 200 can be heated to a temperature of 60° C.-70° C. Subjecting the solid battery cell battery cell 200 to heat can form a low-melting point gel solution by at least dissolving and/or melting the salt that is in the electrode of the solid state battery cell 200 into the solvent that is in the electrode of the solid state battery cell 200. It should be appreciated that the resulting gel solution can have a melting point between 35° C. and 130° C. The melting point of the gel solution may depend on the type of salt, the type of solvent, and/or the concentration of salts present in the gel solution.

Referring to FIG. 2, the solid state battery cell 200 can include a lithium (Li) metal anode and a cathode that is disposed on the surface of a current collector formed from aluminum (Al) foil. The solid state battery cell 200 can include the SSE particles 100, which can be disposed between the lithium (Li) metal anode and the cathode of the solid state battery cell 200. In some implementations of the current subject matter, at least one electrode (e.g., cathode) of the solid state battery cell 200 can contain a plurality of SIS components such as, for example, salts. One or more SIS components can be further dispersed within the SSE particles 110. As shown in FIG. 2, the solid state battery cell 200 can include a first SIS component 212, a second SIS component 214, a third SIS component 216, and a fourth SIS component 218. When the solid state battery cell 200 is subjected to elevated temperatures (e.g., 60° C.-70° C.), these SIS components (e.g., salts) can melt and/or dissolve to form the SIS 110, which can be a highly concentrated electrolyte solution with a low melting point. The SIS 110 can acts as a conformal coating on the surface of both the SSE particles 100 and the electrodes of the solid state battery cell 200.

In some implementations of the current subject matter, the components of the SIS 110 can be salts (e.g., a lithium salt such as Li-imide), which can be incorporated into the electrode (e.g., cathode) material and the SSE particles 110. Cathode material containing the salts can be coated onto the aluminum (Al) current collector before the SSE particles 100 containing the salts are coated onto the surface of the cathode material. The solid state battery cell 200 can be filled with a low melting point solvent (e.g., dimethyl carbonate, poly glycol) and subjected to elevated temperatures (e.g., 70° C.). Subjecting the solid state battery cell 200 to elevated temperatures can dissolve and/or melt the salt that is in both the electrode and the SSE particles 100.

To further illustrate, an example embodiment of the solid state battery cell 200 can be include a lithium (Li) metal anode. The SSE particles 100 can be formed from $Li_7P_3S_{11}$ while the SIS 110 can be formed from a combination of 40% lithium imide (Li-imide) salt and 60% Diethylene Glycol Dimethyl Ether solvent. A cathode formed from $LiNi_{0.33}Co_{0.33}Mn_{0.33}O_2$, carbon black, lithium imide (Li-imide) can be disposed on the surface of a current collector formed from aluminum (Al) foil. This example embodiment of the solid state battery cell 200 can be subject to high voltage levels such as, for example, 4.5 volts, without adverse effects on the stability solid state battery cell 200.

Figure 3:
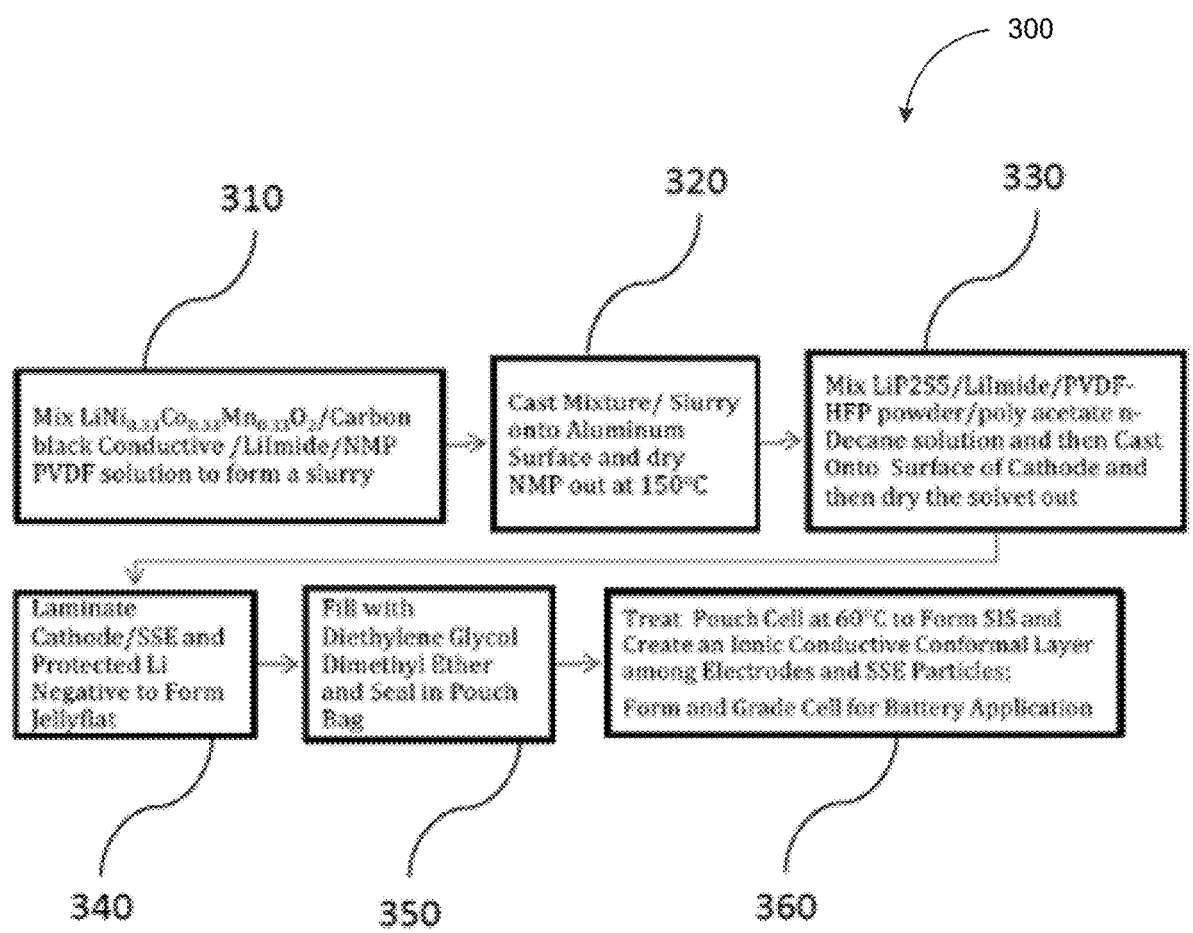
FIG. 3 depicts a flowchart illustrating a process for manufacturing a battery with hybrid solid state electrolyte consistent with implementations of the current subject matter.

FIG. 3 depicts a flowchart illustrating a process 300 for manufacturing a battery with hybrid solid state electrolyte consistent with implementations of the current subject matter. A mixture of the SSE particles 100 and components of the SIS 110, such as lithium (Li) salt, can be coated on the surface of an electrode prior to assembling the battery cell. The anode of the battery cell can be formed from lithium (Li) metal by at least i) mixing stabilized lithium (Li) metal particles, a solvent like toluene or hexane, lithium (Li) salt, and solid state ionic electrolyte, and (ii) coating the mixture onto a substrate such as nickel (Ni) foam, cooper (Cu) foil, and/or copper (Cu) foam. The cathode of the battery cell can be formed from a lithium manganese cobalt nickel oxide (e.g., $LiNi_{0.33}Co_{0.33}Mn_{0.33}O_2$), a lithium manganese oxide, and/or the like.

At 310, lithium manganese cobalt nickel oxide (e.g., $LiNi_{0.33}Co_{0.33}Mn_{0.33}O_2$), carbon black, lithium imide (Li-imide), N-methylpyrrolidone (NMP), and a polyvinylidene fluoride (PVDF) binder are mixed to form a slurry.

At 320, the slurry is cast onto an aluminum (Al) surface such as, for example, aluminum (Al) foil. The slurry is further dried at 150° C. to remove the N-methylpyrrolidone (NMP).

At 330, LiP2S5, lithium imide (Li-imide), a polyvinylidene fluoride (PVDF) PVDF-HFP powder, and a poly acetate n-decane solution are mixed. The mixture is cast onto the surface of the cathode and dried.

At 340, cathode material, the SSE particles 110, and protected negative lithium (Li) particles are laminated to form a jelly flat, which is inserted into a composite bag.

At 350, the composite bag is filled with a solvent such as, for example, diethylene glycol dimethyl ether. The composite bag is sealed to form a battery cell.

At 360, the battery cell is heated to 60° C.-70° C. to form the SIS 110 in situ, thereby creating a hybrid SSE in which the SSE particles 110 are suspended in the SIS 110.

Implementations of the current subject matter can include, but are not limited to, articles of manufacture (e.g. apparatuses, systems, etc.), methods of making or use, compositions of matter, or the like consistent with the descriptions provided herein.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claim.

What is claimed is:

1. A battery, comprising:
   an electrode having a mixture deposited on at least one surface of the electrode, the mixture including a plurality of solid state electrolyte particles and at least a portion of a salt; and
   a solvent, the solvent forming a hybrid solid state electrolyte in situ when the battery is subject to heat, the heating of the battery forming a salt-in-solvent by at least melting and/or dissolving at least the portion of the salt into the solvent, the hybrid solid state electrolyte formed in situ including the plurality of solid state electrolyte particles suspended in the salt-in-solvent, and the salt-in-solvent comprising a concentrated liquid electrolyte without any free solvent molecules.

2. The battery of claim 1, wherein the solid state electrolyte particles comprise a sulfide-based solid state electrolyte.

3. The battery of claim 2, wherein the sulfide-based solid state electrolyte comprises $Li_2S$—$SiS_2$—$P_2S_5$, $Li_7P_3S_{11}$, and/or $Li_{4.34}Ge_{0.73}Ga_{0.24}S_4$.

4. The battery of claim 1, wherein the solid state electrolyte particles comprise a garnet-type lithium ion-conducting oxide.

5. The battery of claim 4, wherein the garnet-type lithium ion-conducting oxide comprises $Li_7La_3Zr_2O_{12}$.

6. The battery of claim 1, wherein the solid state electrolyte particles comprise a ceramic ion conductor having a frame work structure that includes $SiO_4$, $PO_4$, and/or $ZnO_4$.

7. The battery of claim 1, wherein the salt-in-solvent comprises a salt and a solvent.

8. The battery of claim 7, wherein the salt comprises lithium bis(perfluoroethylsulfonyl) imide [LiN(SO$_2$CF$_2$CF$_3$)$_2$ (LiBETI)], lithium bis [(1,1,1,3,3,3-hexafluoro-2-propoxy) sulfonyl] imide (LiN[SO$_2$OCH(CF$_3$)$_2$]$_2$ (LiHFPSI)), lithium hexafluorophoshate (LiFP$_6$), lithium chloride (LiCl), lithium perchlorate (LiClO$_4$), lithium nitrate (LiNO$_3$), lithium bistrifluoromethanesulfonimidate (LiN(SO$_2$CF$_3$)$_2$ (LITFSI)), and/or oligomeric bis [(perfluoroalkyl)sulfonyl]imide (fluorosulfonimide) lithium salts.

9. The battery of claim 7, wherein the solvent comprises poly glycol, propylene carbonate (PC), ethylene carbonate (EC), acetone, acetonitrile, diethyl ether, diglyme (diethylene glycol dimethyl ether), dimethyl sulfoxide, 1, 4-dioxane, ethyl acetate, methyl t-butyl ether (MTBE), N-methyl-2-pyrrolidinone (NMP), pyridine, tetrahydrofuran (THF), crown ether, fluoride, xylene, 1-methoxy-2-propyl acetate, and/or phosphorus.

10. The battery of claim 7, wherein the salt-in-solvent further comprises a gelling agent, the gelling agent comprising a polymer.

11. A method, comprising:
    depositing, on a surface of an electrode of a battery, a mixture comprising a plurality of solid state electrolyte particles and at least a first portion of salt;

filling the battery with a solvent; and forming a hybrid solid state electrolyte in situ by at least heating the battery, the heating of the battery forming a salt-in-solvent by at least melting and/or dissolving the first portion of the salt into the solvent, the hybrid solid state electrolyte comprising the plurality of solid state electrolyte particles and the salt-in-solvent.

12. The method of claim 11, wherein the electrode provides a second portion of the salt comprising the salt-in-solvent, and wherein the heating of the battery further forms the salt-in-solvent by at least the melting and/or dissolving the second portion of the salt into the solvent.

13. The method of claim 11, wherein the battery is heated to a temperature of 60° C.–70° C.

14. The battery of claim 1, wherein every solvent molecule in the concentrated liquid electrolyte is paired with one or more salt ions.

* * * * *